(12) United States Patent
Lindner

(10) Patent No.: US 7,857,159 B2
(45) Date of Patent: Dec. 28, 2010

(54) ARTICLE SEAL ASSEMBLY

(75) Inventor: Markus Lindner, Mainz (DE)

(73) Assignee: GM Global Technology Operations, Inc., Detroit, MI (US)

(*) Notice: Subject to any disclaimer, the term of this patent is extended or adjusted under 35 U.S.C. 154(b) by 357 days.

(21) Appl. No.: 12/029,492

(22) Filed: Feb. 12, 2008

(65) Prior Publication Data
US 2009/0200757 A1 Aug. 13, 2009

(51) Int. Cl.
F17C 1/02 (2006.01)
(52) U.S. Cl. ..................... 220/586; 277/641
(58) Field of Classification Search ............. 220/4.14, 220/86.1, 86.2, 552, 586; 277/641, 643, 277/650, 910
See application file for complete search history.

(56) References Cited
U.S. PATENT DOCUMENTS
4,331,175 A * 5/1982 Brake et al. ............ 137/322
5,429,845 A 7/1995 Newhouse et al.
5,798,156 A 8/1998 Mitlitsky et al.
6,186,356 B1 * 2/2001 Berkley et al. ............. 220/582
6,216,907 B1 * 4/2001 Morneau .............. 220/495.05
6,227,402 B1 * 5/2001 Shimojima et al. .......... 220/581
2004/0104235 A1 * 6/2004 Sakaguchi et al. .......... 220/581

FOREIGN PATENT DOCUMENTS
CN         1132841 A1    10/1996
DE    10 2006 001 052 A1  9/2007
WO    WO 2007/079971 A1   7/2007

* cited by examiner

Primary Examiner—Harry A Grosso
(74) Attorney, Agent, or Firm—Fraser Clemens Martin & Miller LLC; J. Douglas Miller

(57) ABSTRACT

A seal assembly is disclosed including a support member, a first seal, a second seal spaced apart from the first seal, and a third seal, wherein the first seal militates against a leakage of fluid when an interior of an article to be sealed is subjected to at least one of temperatures below a predetermined temperature and pressures below a predetermined pressure, and the second seal and the third seal militate against the leakage of fluid when the interior of the article to be sealed is subjected to at least one of temperatures above the predetermined temperature and pressures above the predetermined pressure.

19 Claims, 1 Drawing Sheet

ARTICLE SEAL ASSEMBLY

FIELD OF THE INVENTION

The invention relates to an article for storing a fluid. More particularly, the invention is directed to a seal assembly adapted to cooperate with the article, which militates against a leakage of the fluid when an interior of the article is subjected to various temperatures and pressures.

BACKGROUND SUMMARY

Presently there are a variety of pressure vessels developed for use in various applications, such as those designed to contain gases for use in fuel cells. Fuel cells have been proposed as a clean, efficient and environmentally responsible power source for electric vehicles and various other applications. One example of a fuel cell is a Proton Exchange Membrane (PEM) fuel cell. In the PEM type fuel cells, hydrogen is supplied as a fuel to an anode of the fuel cell and oxygen is supplied as an oxidant to a cathode of the fuel cell. Hydrogen is colorless, odorless, burns without producing a visible flame or radiant heat, and is difficult to contain. A common technique for storing hydrogen is in a lightweight, high pressure vessel resistant to punctures.

Traditionally such vessels are divided into four types. A Type I vessel is a metal vessel. A Type II vessel is also a metal vessel, the vessel having an outer composite shell disposed on a cylindrical section thereof. A Type III vessel consists of a liner produced from a metal such as steel and aluminum, for example, and an outer composite shell that encompasses the liner and militates against damage thereto. A Type IV vessel is substantially similar to the Type III vessel, wherein the liner is produced from a plastic. Furthermore, a conceptual Type V vessel may be developed, wherein the vessel is produced from a composite material. Each type of vessel may include at least one boss disposed therein to receive a valve.

Typically, the valve disposed in the boss includes a valve housing having an external groove terminating in an annular flange. The flange is formed on the valve housing adjacent the groove to abut a liner of the vessel. An O-ring having an inner surface and an outer surface is seated in the groove of the valve housing to militate against a leakage of fluid from the vessel. The inner surface of the O-ring is adapted to abut the groove to form a substantially fluid-tight seal therebetween. The outer surface is adapted to abut the liner to form a substantially fluid-tight seal therebetween. During operation, an interior of the vessel is subjected to temperatures below a predetermined temperature such as during defueling, for example. The temperatures below the predetermined temperature cause the O-ring to contract radially inwardly onto the valve housing. Accordingly, a passage is formed between the outer surface of the O-ring and the liner, causing the leakage of fluid therethrough.

In WO 2007079971, hereby incorporated herein by reference in its entirety, a pressure vessel is disclosed for storing a liquid or gaseous media. The pressure vessel includes a plastic core having at least one neck portion. The neck portion of the core is disposed between a connecting ring and a supporting flange. The connecting ring includes an annular groove formed therein to receive an O-ring. The O-ring is adapted to be sealingly forced against the neck of the core in response to changes in a pressure of an interior of the vessel. A disadvantage of the pressure vessel is the O-ring contracts at lower temperatures to form a passage therethrough, permitting a leakage of the media therefrom.

It would be desirable to produce a seal assembly which is capable of militating against a leakage of fluid at various temperatures above and below a predetermined temperature and pressures above and below a predetermined pressure, wherein the effectiveness and reliability are maximized and cost thereof is minimized.

SUMMARY OF THE INVENTION

In concordance and agreement with the present invention, a seal assembly which is capable of militating against a leakage of fluid at various temperatures above and below a predetermined temperature and pressures above and below a predetermined pressure, wherein the effectiveness and reliability are maximized and cost thereof is minimized, has surprisingly been discovered.

In one embodiment, the seal assembly comprises a support member having an outer surface; a first seal disposed on the outer surface of the support member, the first seal having an inner sealing surface and an outer sealing surface; and a second seal spaced apart from the first seal forming an interstice therebetween, the second seal having an inner sealing surface and an outer sealing surface, the interstice adapted to receive an article to be sealed therein.

In another embodiment, the sealing system comprises an article to be sealed, the article having an inner surface and an outer surface; and a seal assembly adapted to cooperate with the article to be sealed, the seal assembly further comprising: a support member including a first portion and a second portion, the second portion disposed on an outer surface of the first portion; a first seal disposed on the outer surface of the first portion of the support member, the first seal having an inner sealing surface and an outer sealing surface, wherein the inner sealing surface is adapted to abut the outer surface of the first portion of the support member in response to at least one of temperatures below a predetermined temperature and pressures below a predetermined pressure to form a substantially fluid-tight seal therebetween, and the outer sealing surface is adapted to abut the inner surface of the article to be sealed in response to at least one of temperatures below the predetermined temperature and pressures below the predetermined pressure to form a substantially fluid-tight seal therebetween; and a second seal spaced apart from the first seal forming an interstice therebetween, the second seal having an inner sealing surface and an outer sealing surface, wherein the inner sealing surface is adapted to abut the outer surface of the article to be sealed in response to at least one of temperatures above the predetermined temperature and pressures above the predetermined pressure to form a substantially fluid-tight seal therebetween, the interstice adapted to receive the article to be sealed therein.

In another embodiment, the sealing system for a pressure vessel comprises a vessel including at least one boss having an annular recess formed therein; a valve having an annular recess formed therein disposed in the at least one boss; a liner having at least one neck portion formed thereon disposed in the vessel for containing a fluid, the at least one neck portion having an inner surface and an outer surface; and a seal assembly adapted to cooperate with the liner and the valve, the seal assembly further comprising: a support member including a first portion and a second portion, the second portion disposed on an outer surface of the first portion; a first seal disposed on the outer surface of the first portion of the support member, the first seal having an inner sealing surface and an outer sealing surface, wherein the inner sealing surface is adapted to abut the outer surface of the first portion of the support member in response to at least one of temperatures below a predetermined temperature and pressures below a predetermined pressure to form a substantially fluid-tight seal therebetween, and the outer sealing surface is adapted to abut the inner surface of the at least one neck portion of the liner in response to at least one of temperatures below the predetermined temperature and pressures below the predetermined pressure to form a substantially fluid-tight seal therebetween; a second seal disposed in the annular recess of the at least one boss and spaced apart from the first seal to form an interstice therebetween, the second seal having an inner sealing surface and an outer sealing surface, wherein the inner sealing surface is adapted to abut the outer surface of the liner in response to at least one of temperatures above the predetermined temperature and pressures above the predetermined pressure to form a substantially fluid-tight seal therebetween, and the outer sealing surface is adapted to abut the annular recess of the at least one boss in response to at least one of temperatures above the predetermined temperature and pressures above the predetermined pressure to form a substantially fluid-tight seal therebetween; and a third seal disposed in the annular recess of the valve, the third seal having an inner sealing surface and an outer sealing surface, wherein the inner sealing surface is adapted to abut the annular recess of the valve in response to at least one of temperatures above the predetermined temperature and pressures above the predetermined pressure to form a substantially fluid-tight seal therebetween, and the outer sealing surface is adapted to abut the at least one boss in response to at least one of temperatures above the predetermined temperature and pressures above the predetermined pressure to form a substantially fluid-tight seal therebetween.

DESCRIPTION OF THE DRAWINGS

The above features of the invention will become readily apparent to those skilled in the art from reading the following detailed description of the invention when considered in the light of the accompanying drawings, in which.

DETAILED DESCRIPTION OF THE PREFERRED EMBODIMENT

The following detailed description and appended drawings describe and illustrate an embodiment of the invention. The description and drawings serve to enable one skilled in the art to make and use the invention, and are not intended to limit the scope of the invention in any manner.

Figure 1:
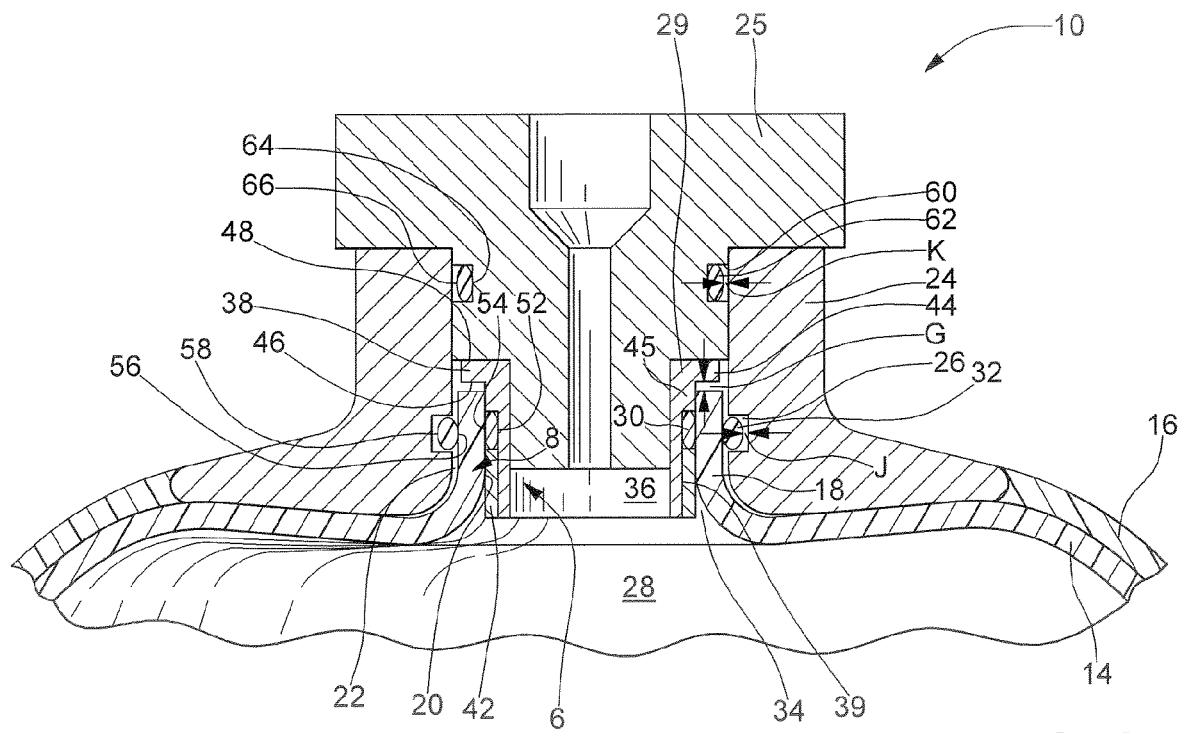
FIG. 1 is a fragmentary sectional view of a pressure vessel having a seal assembly disposed therein according to an embodiment of the invention, wherein a first seal of the seal assembly militates against a leakage from the pressure vessel when subjected to at least one of temperatures below a predetermined temperature and pressures below a predetermined pressure.
Figure 2:
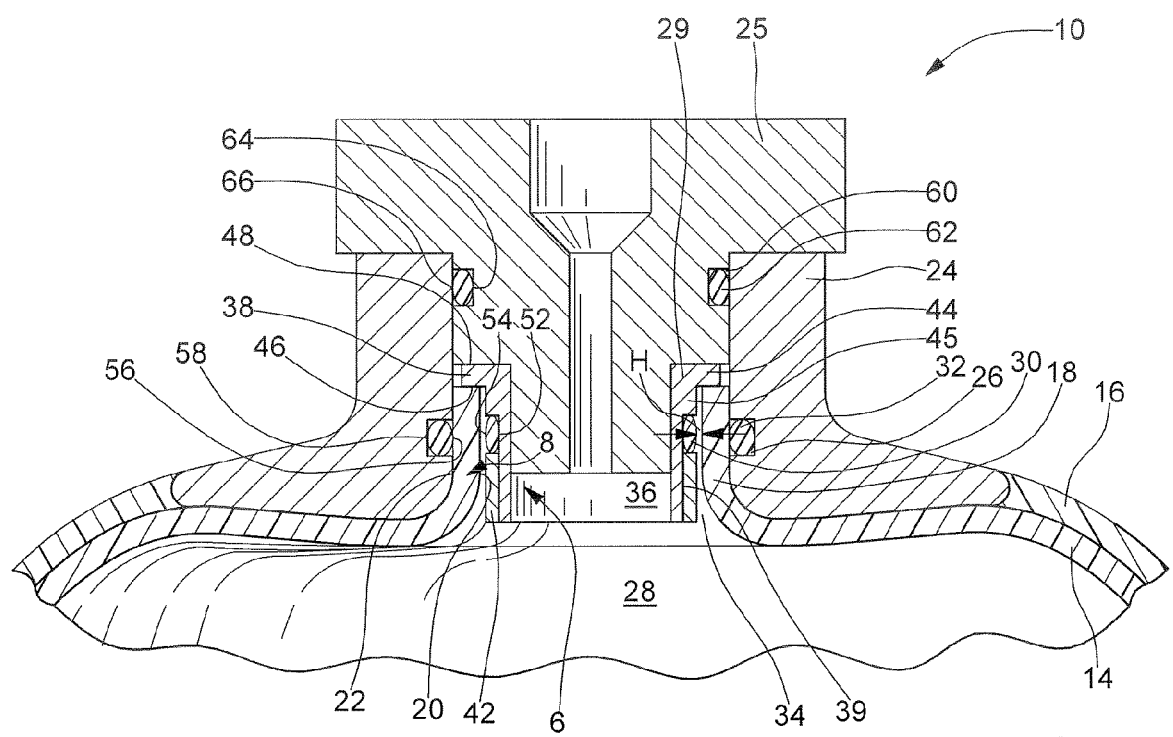
FIG. 2 is a fragmentary sectional view of the pressure vessel illustrated in FIG. 1, wherein a second seal of the seal assembly and a third seal of the seal assembly militate against a leakage from the pressure vessel when subjected to at least one of temperatures above the predetermined temperature and pressures above the predetermined pressure.

FIGS. 1 and 2 show a seal assembly 6 adapted to cooperate with an article to be sealed 8 according to an embodiment of the invention. In the embodiment shown, the seal assembly 6 is disposed in a pressure vessel 10 such as a Type IV vessel and a Type V vessel, for example. The vessel 10 includes a liner 14 adapted to contain a pressurized fluid (not shown) and an outer composite shell 16 that encompasses the liner 14 and militates against damage thereto. In the embodiment shown, the article to be sealed 8 is at least one neck portion 18 of the liner 14. The article to be sealed 8 includes an inner surface 20 and an outer surface 22. Although the article to be sealed 8 in the embodiment shown is produced from a plastic material, it is understood that other materials can be used as desired.

The vessel 10 is provided with at least one boss 24 for receiving a valve 25 therein. The at least one boss 24 includes an annular recess 26 formed therein. The at least one boss 24 can be produced from any conventional material such as a metal, for example, wherein the material has a coefficient of thermal expansion less than a coefficient of thermal expansion of the material used to produce the article to be sealed 8. It is understood that the term "coefficient of thermal expansion" used herein refers to a rate of expansion of a material in response to a heating and a rate of contraction of the material in response to a cooling. The seal assembly 6 is disposed in the boss 24 adjacent the valve 25.

The seal assembly 6 includes a ring-shaped support member 29, a first seal 30, and a second seal 32. The second seal 32 is spaced apart from the first seal 30 to form an interstice 34 therebetween. The interstice 34 is adapted to receive the article to be sealed 8 therein. The support member 29 is generally circular in cross-sectional shape having a passage 36 formed therethrough to facilitate fluid communication between an interior 28 of the vessel 10 and the valve 25. The support member 29 can be produced from any conventional material such as a metal, for example, wherein the material has a coefficient of thermal expansion less than the coefficient of thermal expansion of the material used to produce the article to be sealed 8. The support member 29 includes a first portion 38 and a second portion 42 adapted to be joined therewith. It is understood that the first portion 38 and the second portion 42 can be joined by any conventional means such as a fastener, glue, threads, and the like, for example.

The first portion 38 of the support member 29 includes an outer surface 39 having an annular flange 44 formed thereon. The outer surface 39 terminates in an annular shoulder 45 having an outer circumference adapted to abut the article to be sealed 8. The outer surface 39 is adapted to receive the first seal 30 and the second portion 42 of the support member 29 thereon. The annular flange 44 includes a first surface 46 and a second surface 48. The first surface 46 is adapted to abut the article to be sealed 8 and the second surface 48 is adapted to abut the valve 25. As shown in FIG. 1, an annular gap G is formed between the first surface 46 of the annular flange 44 and the article to be sealed 8 in response to at least one of temperatures below a predetermined temperature and pressures below a predetermined pressure. In the embodiment shown, the predetermined temperature is in a range of −80 degrees Celsius to 85 degrees Celsius and the predetermined pressure is in a range of 0.1 MPa to 87.5 MPa. It is understood that the predetermined temperature can be any temperature as desired and the predetermined pressure can be any pressure as desired. The second portion 42 of the support member 29 is adapted to militate against a displacement of the first seal 30.

The first seal 30 is generally circular in shape and adapted to be received on the outer surface 39 of the support member 29. The first seal 30 includes an inner surface having an inner sealing surface 52 and an outer surface having an outer sealing surface 54. As shown in FIG. 1, the inner sealing surface 52 of the first seal 30 is adapted to abut the outer surface 39 of the support member 29 in response to at least one of temperatures below the predetermined temperature and pressures below the predetermined pressure to form a substantially fluid-tight seal therebetween. The outer sealing surface 54 of the first seal 30 is adapted to abut the article to be sealed 8 thereon in response to at least one of temperatures below the predetermined temperature and pressures below the predetermined pressure to form a substantially fluid-tight seal therebetween.

As illustrated in FIG. 2, the inner sealing surface 52 of the first seal 30 is adapted to abut the outer surface 39 of the support member 29 in response to at least one of temperatures above the predetermined temperature and pressures above the predetermined pressure. An annular gap H is formed between the outer sealing surface 54 of the first seal 30 and the article to be sealed 8 in response to at least one of temperatures above the predetermined temperature and pressures above the predetermined pressure. In the embodiment shown, the first seal 30 is produced from a metal material having a coefficient of thermal expansion less than the coefficient of thermal expansion of the material used to produce the article to be sealed 8. It is understood that the first seal 30 can be produced from any conventional material as desired.

The second seal 32 is generally circular in shape and adapted to be received in the annular recess 26 of the at least one boss 24. The second seal 32 includes an inner surface having an inner sealing surface 56 and an outer surface having an outer sealing surface 58. As shown in FIG. 1, the inner sealing surface 56 of the second seal 32 is adapted to abut the article to be sealed 8 in response to at least one of temperatures below the predetermined temperature and pressures below the predetermined pressure. An annular gap J is formed between the outer sealing surface 58 of the second seal 32 and the annular recess 26 of the at least one boss 24 in response to at least one of temperatures below the predetermined temperature and pressures below the predetermined pressure.

As illustrated in FIG. 2, the inner sealing surface 56 of the second seal 32 is adapted to abut the article to be sealed 8 in response to at least one of temperatures above the predetermined temperature and pressures above the predetermined pressure to form a substantially fluid-tight seal therebetween. The outer sealing surface 58 of the second seal 32 is adapted to abut the annular recess 26 of the at least one boss 24 in response to at least one of temperatures above the predetermined temperature and pressures above the predetermined pressure to form a substantially fluid-tight seal therebetween. In the embodiment shown, the second seal 32 is produced from a plastic material having a coefficient of thermal expansion similar to the coefficient of thermal expansion of the material used to produce the article to be sealed 8. It is understood that the second seal 32 can be produced from any conventional material as desired.

In the embodiment shown, the valve 25 includes an annular recess 60 formed therein. The annular recess 60 is adapted to receive a third seal 62 therein. The third seal 62 is generally circular in shape and includes an inner surface having an inner sealing surface 64 and an outer surface having an outer sealing surface 66. As shown in FIG. 1, the inner sealing surface 64 of the third seal 62 is adapted to abut the annular recess 60 of the valve 25 in response to at least one of temperatures below the predetermined temperature and pressures below the predetermined pressure. An annular gap K is formed between the outer sealing surface 66 of the third seal 62 and the at least one boss 24 in response to at least one of temperatures below the predetermined temperature and pressures below the predetermined pressure.

As illustrated in FIG. 2, the inner sealing surface 64 of the third seal 62 is adapted to abut the annular recess 60 of the valve 25 in response to at least one of temperatures above the predetermined temperature and pressures above the predetermined pressure to form a substantially fluid-tight seal therebetween. The outer sealing surface 66 of the third seal 62 is adapted to abut the at least one boss 24 in response to at least one of temperatures above the predetermined temperature and pressures above the predetermined pressure to form a substantially fluid-tight seal therebetween. In the embodiment shown, the third seal 62 is produced from a plastic material having a coefficient of thermal expansion similar to the coefficient of thermal expansion of the material used to produce the article to be sealed 8. It is understood that the third seal 62 can be produced from any conventional material as desired.

FIGS. 1 and 2 illustrate the seal assembly 6 in use. In the embodiment shown, the at least one neck portion 18 is produced from high density polyethylene (HDPE) having a coefficient of thermal expansion of 0.000059 to 0.000125 inch/inch/degrees Celsius. Further, the boss 24, the support member 29, and the first seal 30 are produced from a steel material having a coefficient of thermal expansion of 0.000010 to 0.000020 inch/inch/degrees Celsius. The second seal 32 and the third seal 62 are produced from a plastic material having a coefficient of thermal expansion of 0.000025 to 0.000200 inch/inch/degrees Celsius.

Accordingly, when the interior 28 of the vessel 10 is subjected to at least one of temperatures below the predetermined temperature and pressures below the predetermined pressure as shown in FIG. 1, the at least one neck portion 18 of the liner 14, the second seal 32, and the third seal 62 are caused to contract more than the boss 24, the support member 29, and the first seal 30. Thus, the contraction of the at least one neck portion 18 causes the gap G to be formed between the annular flange 44 of the support member 29 and the at least one neck portion 18. The inner surface 20 of the at least one neck portion 18 is caused to abut the outer sealing surface 54 of the first seal 30, militating against the leakage of fluid from the vessel 10. Simultaneously, the contraction of the first seal 30 causes the inner sealing surface 52 of the first seal 30 to abut the outer surface 39 of the support member 29, militating against the leakage of fluid from the vessel 10. Further, the contraction of the second seal 32 causes the gap J to be formed between the outer sealing surface 58 of the second seal 32 and the annular recess 26 of the at least one boss 24. The inner sealing surface 56 of the second seal 32 is also caused to abut the at least one neck portion 18 of the liner 14. As illustrated, the contraction of the third seal 62 causes the gap K to be formed between the outer sealing surface 66 of the third seal 62 and the at least one boss 24. The inner sealing surface 64 of the third seal 62 is caused to abut the annular recess 60 of the valve 25.

When the interior 28 of the pressure vessel 10 is subjected to at least one of temperatures above the predetermined temperature and pressures above the predetermined pressure as shown in FIG. 2, the at least one neck portion 18 of the liner 14, the second seal 32, and the third seal 62 are caused to expand more than the boss 24, the support member 29, and the first seal 30. Thus, the expansion of the at least one neck portion 18 causes the gap H to be formed between the outer sealing surface 54 of the first seal 30 and the at least one neck portion 18. The inner sealing surface 52 of the first seal 30 is caused to abut the outer surface 39 of the support member 29. Simultaneously, the expansion of the second seal 32 causes the outer sealing surface 58 of the second seal 32 to abut the annular recess 26 of the at least one boss 24, militating against the leakage of fluid from the vessel 10. The inner sealing surface 56 of the second seal 32 is caused to abut the at least one neck portion 18 of the liner 14, militating against the leakage of fluid from the vessel 10. Moreover, the expansion of the third seal 62 causes the inner sealing surface 64 of the third seal 62 to abut the annular recess 60 of the valve 25, militating against the leakage of fluid from the vessel 10. The outer sealing surface 66 of the third seal 62 is also caused to abut the at least one boss 24, militating against the leakage of fluid from the vessel 10.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A seal assembly comprising:
a support member disposed in a vessel, the support member having an outer surface;
a first seal disposed on the outer surface of the support member, the first seal having an inner sealing surface and an outer sealing surface; and
a second seal disposed in an annular recess formed in at least one boss of the vessel, wherein the second seal is spaced apart from the first seal forming an interstice therebetween, the second seal having an inner sealing surface and an outer sealing surface, the interstice adapted to receive an article to be sealed therein.

2. The seal assembly according to claim 1, wherein the support member includes a first portion and a second portion, the second portion disposed on the outer surface of the support member.

3. The seal assembly according to claim 1, wherein the outer sealing surface of the first seal is adapted to abut the article to be sealed in response to at least one of temperatures below a predetermined temperature and pressures below a predetermined pressure to form a substantially fluid-tight seal therebetween.

4. The seal assembly according to claim 3, wherein the inner sealing surface of the second seal is adapted to abut the article to be sealed in response to at least one of temperatures above the predetermined temperature and pressures above the predetermined pressure to form a substantially fluid-tight seal therebetween.

5. The seal assembly according to claim 3, wherein the inner sealing surface of the first seal is adapted to abut the support member in response to at least one of temperatures below the predetermined temperature and pressures below the predetermined pressure to form a substantially fluid-tight seal therebetween.

6. The seal assembly according to claim 3, wherein the predetermined temperature is in a range of −80 degrees Celsius to 85 degrees Celsius and the predetermined pressure is in a range of 0.1 MPa to 87.5 MPa.

7. The seal assembly according to claim 1, further comprising a valve adapted to be received in the at least one boss of the vessel, the valve having an annular recess for receiving a third seal formed therein.

8. The seal assembly according to claim 1, wherein the support member is produced from a material having a coefficient of thermal expansion less than a coefficient of thermal expansion of a material used to produce the article to be sealed.

9. The seal assembly according to claim 8, wherein the support member, the first seal, the second seal, and the article to be sealed are produced from at least one of a metal and a plastic.

10. The seal assembly according to claim 1, wherein the article to be sealed is a liner of the vessel.

11. A sealing system comprising:
a vessel including at least one boss and a liner, the at least one boss having an annular recess formed therein, and the liner having an inner surface and an outer surface; and
a seal assembly adapted to cooperate with the vessel, the seal assembly further comprising:
a support member disposed in the vessel, the support member including a first portion and a second portion, wherein the second portion is disposed on an outer surface of the first portion;
a first seal disposed on the outer surface of the first portion of the support member, the first seal having an inner sealing surface and an outer sealing surface, wherein the inner sealing surface is adapted to abut the outer surface of the fist portion of the support member in response to at least one of temperatures below a predetermined temperature and pressures below a predetermined pressure to form a substantially fluid-tight seal therebetween, and the outer sealing surface is adapted to abut the inner surface of the liner in response to at least one of temperatures below the predetermined temperature and pressures below the predetermined pressure to form a substantially fluid-tight seal therebetween; and
a second seal disposed in the annular recess of the at least one boss, wherein the second seal is spaced apart from the first seal forming an interstice therebetween, the second seal having an inner sealing surface and an outer sealing surface, wherein the inner sealing surface is adapted to abut the outer surface of the liner in response to at least one of temperatures above the predetermined temperature and pressures above the predetermined pressure to form a substantially fluid-tight seal therebetween, the interstice adapted to receive at least a portion of the liner therein.

12. The sealing system according to claim 11, further comprising a valve adapted to be received in the at least one boss of the vessel, the valve having an annular recess for receiving a third seal formed therein.

13. The sealing system according to claim 11, wherein the predetermined temperature is in a range of −80 degrees Celsius to 85 degrees Celsius and the predetermined pressure is in a range of 0.1 MPa to 87.5 MPa.

14. The sealing system according to claim 11, wherein the support member is produced from a material having a coefficient of thermal expansion less than a coefficient of thermal expansion of a material used to produce the liner.

15. The sealing system according to claim 14, wherein the support member, the first seal, the second seal, and the liner are produced from at least one of a metal and a plastic.

16. A sealing system for a pressure vessel comprising:
a vessel including at least one boss having an annular recess formed therein;
a valve having an annular recess formed therein disposed in the at least one boss;
a liner having at least one neck portion formed thereon disposed in the vessel for containing a fluid, the at least one neck portion having an inner surface and an outer surface; and
a seal assembly adapted to cooperate with the liner and the valve, the seal assembly further comprising:
a support member including a first portion and a second portion, the second portion disposed on an outer surface of the first portion;
a first seal disposed on the outer surface of the first portion of the support member, the first seal having an inner sealing surface and an outer sealing surface, wherein the inner sealing surface is adapted to abut the outer surface of the first portion of the support member in response to at least one of temperatures below a predetermined temperature and pressures below a predetermined pressure to form a substantially fluid-tight seal therebetween, and the outer sealing surface is adapted to abut the inner surface of the at least one neck portion of the liner in response to at least one of temperatures below the predetermined temperature and pressures below the predetermined pressure to form a substantially fluid-tight seal therebetween;

a second seal disposed in the annular recess of the at least one boss and spaced apart from the first seal to form an interstice therebetween, the second seal having an inner sealing surface and an outer sealing surface, wherein the inner sealing surface is adapted to abut the outer surface of the liner in response to at least one of temperatures above the predetermined temperature and pressures above the predetermined pressure to form a substantially fluid-tight seal therebetween, and the outer sealing surface is adapted to abut the annular recess of the at least one boss in response to at least one of temperatures above the predetermined temperature and pressures above the predetermined pressure to form a substantially fluid-tight seal therebetween; and a third seal disposed in the annular recess of the valve, the third seal having an inner sealing surface and an outer sealing surface, wherein the inner sealing surface is adapted to abut the annular recess of the valve in response to at least one of temperatures above the predetermined temperature and pressures above the predetermined pressure to form a substantially fluid-tight seal therebetween, and the outer sealing surface is adapted to abut the at least one boss in response to at least one of temperatures above the predetermined temperature and pressures above the predetermined pressure to form a substantially fluid-tight seal therebetween.

17. The sealing system according to claim 16, wherein each of the support member and the at least one boss are produced from a material having a coefficient of thermal expansion less than a coefficient of thermal expansion of a material used to produce the liner of the vessel.

18. The sealing system according to claim 17, wherein the support member, the first seal, the second seal, the third seal, the at least one boss, and the liner are produced from at least one of a metal and a plastic.

19. The sealing system according to claim 16, wherein the predetermined temperature is in a range of −80 degrees Celsius to 85 degrees Celsius and the predetermined pressure is in a range of 0.1 MPa to 87.5 MPa.

* * * * *